(No Model.)
C. H. T. CLAUS.
TRELLIS FOR GRAPE VINES.
No. 319,674. Patented June 9, 1885.
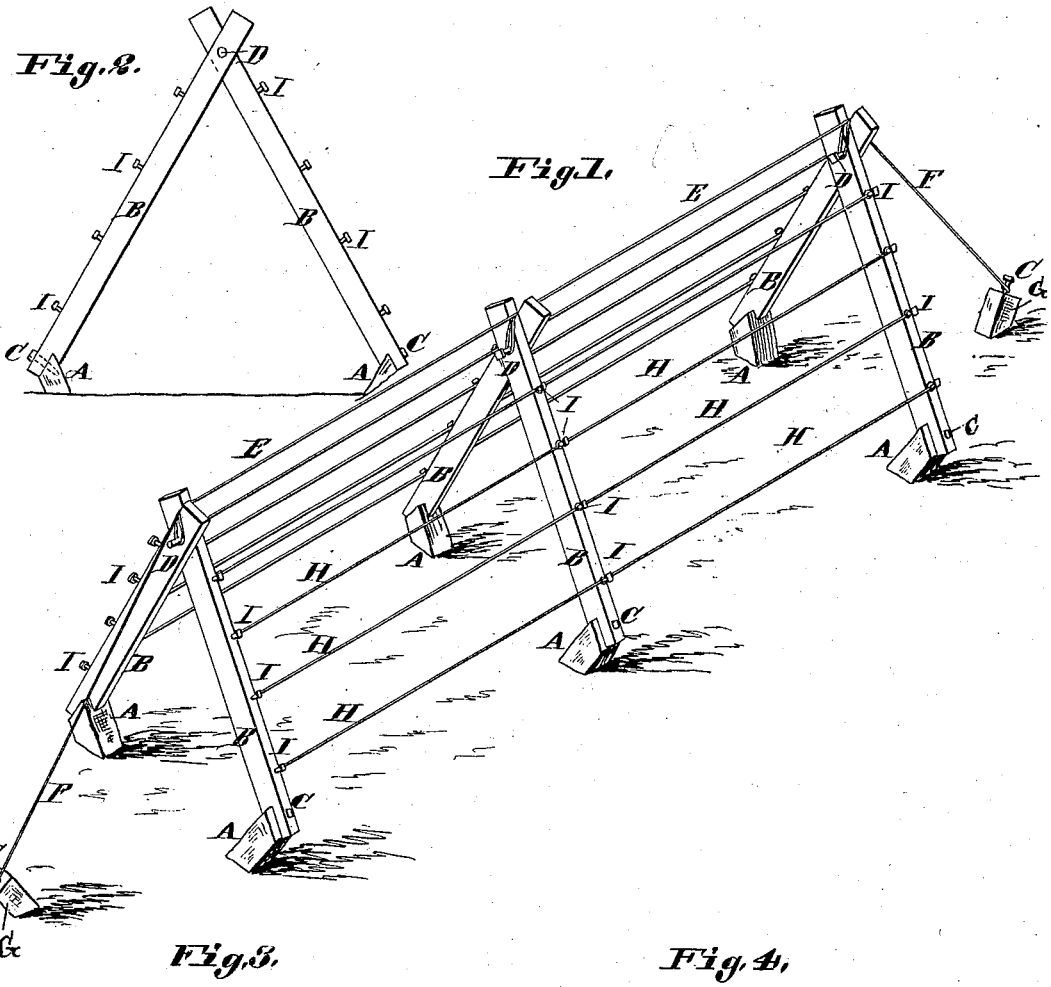
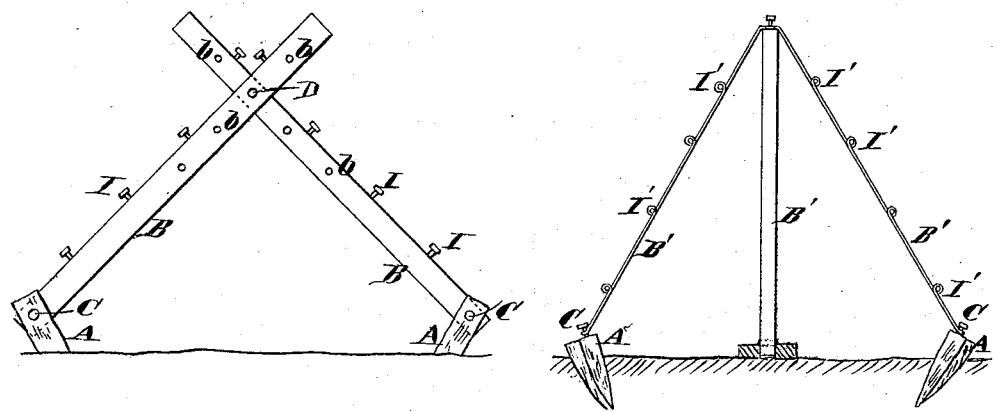
Attest:
Geo. L. Wheelock
Victor A. Lewis
Inventor:
C. H. Theodor Claus
By Knight Bro.
Attys

UNITED STATES PATENT OFFICE.

C. H. THEODORE CLAUS, OF ST. LOUIS, MISSOURI.

TRELLIS FOR GRAPE-VINES.

SPECIFICATION forming part of Letters Patent No. 319,674, dated June 9, 1885.

Application filed August 8, 1884. (No model.)

*To all whom it may concern:*

Be it known that I, C. H. THEODORE CLAUS, of the city of St. Louis, in the State of Missouri, have invented a certain new and useful Improvement in Trellises for Grape-Vines, of which the following is a full, clear, and exact description, reference being had to the accompanying drawings, forming part of this specification.

The standards in this trellis are arranged as the rafters in a roof, being secured together at their upper ends, so that they are perfectly braced against transverse strain upon the trellis. The vines are supported upon horizontal wires connected to the inclined standards, and thus the pairs of standards are connected, the wires extending from pair to pair. Guy-wires extend from the apex of each of the end pairs of standards to stakes in the ground.

Figure 1 is a perspective view of the trellis. Fig. 2 is an end elevation thereof. Figs. 3 and 4 are end elevations showing modifications of the invention.

The trellis is intended for two rows of grape-vines. In constructing it a row of posts, A, are set in the ground in each line of grapes. Usually these posts are pointed and driven down into the ground. They may be four inches square in section and three feet long, (more or less,) and should be made of cedar or other wood which resists decay for a long time. They may be set with one foot projecting above the surface of the ground, with their sides parallel with the rows. Their heads are chamfered, so as to fit the notched lower ends of the upper members, B, of the standards. (See Figs. 1 and 2.) The parts A and B are secured together by a pin, spike, or screw, C. The upper ends of each pair of parts B are put in contact and secured together by a pin, D, driven through them, or by other equivalent device. The members or rafters B may be properly made of pine or other wood devoid of lasting qualities when in contact with the ground. The rafters may be one and one-half or two inches thick and three or four inches broad, and may be from six to eight feet long, being set with their edge up and down. I do not, of course, confine myself to these or any special dimensions. The rafters may be strengthened by a collar-beam or horizontal brace; but this is not essential.

E are wires secured to the pins D of adjacent pairs of rafters, and F are guy-wires extending from the outside pairs of rafters to stakes or posts G, driven into or set in the ground. These end posts, G, should generally be a little larger and stronger than the posts A, and set at an inclination and equidistant between the rows. The stay-wires E and guy-wires F may be about No. 9 gage.

H are horizontal wires for the support of the vines. These are run at suitable distances apart along the upper sides of the rafters, and are secured to the rafters by nails or staples I. The posts A may be set ten or twelve feet apart in the rows, and in this case the wires H may be about 11 or 12 gage.

In the modification shown in Fig. 3 the lower ends of the rafters B are connected to the posts A by pintle-pins, bolts, or screws C, and are connected together at top by pin, bolt, or screw occupying any of a series of holes, *b*, bored through the rafters. In this modification the rafters can be adjusted as to inclination and elevation. This modification is peculiarly adapted to situations liable to storms, as the height may be reduced or the trellis laid down, if desired.

In the modification shown in Fig. 4 the rafters are formed of strong wires, which extend from the posts A upon each side over a vertical standard, B', midway between them. These wires may be kinked or be bent into eyes I', through which the horizontal wires H are passed, after which the eyes are closed upon the wires H. Where this modification is adopted one or more pairs of rafters at each end of the trellis should be of the rigid form shown in Fig. 1, so as to keep the wires H properly stretched.

If desired, when the wire rafters are used, stiff rafters B may be placed at intervals in the trellis.

I claim as my invention—

1. The improved grape-vine trellis comprising a series of inclined rafters, support for the upper ends of the rafters, stakes on which the rafters are supported, a series of wires strung along the outside of the rafters, end posts, and guy-wires extending from the outside pairs of rafters to the end posts.

2. The improved grape-vine trellis comprising posts A, rafters B, having notched lower ends fitting the posts, fastenings C, for securing the rafters to the posts, bolts D, securing the upper ends of the rafters, end stakes, G, and guy-wires F, connecting the end pairs of rafters to the end stakes.

C. H. THEODORE CLAUS.

Witnesses:
 SAML. KNIGHT,
 GEO. H. KNIGHT.